(12) United States Patent
Kravchik et al.

(10) Patent No.: US 10,033,656 B2
(45) Date of Patent: Jul. 24, 2018

(54) CRITICAL RENDERING PATH OPTIMIZATION

(71) Applicant: SAP PORTALS ISRAEL LTD, Ra'anana (IL)

(72) Inventors: Alex Kravchik, Petah Tikva (IL); Evgeny Himmelreich, Lapid (IL)

(73) Assignee: SAP Portals Israel Ltd, Ra'anana (IL)

( * ) Notice: Subject to any disclaimer, the term of this patent is extended or adjusted under 35 U.S.C. 154(b) by 249 days.

(21) Appl. No.: 14/718,319

(22) Filed: May 21, 2015

(65) Prior Publication Data

US 2016/0344649 A1 Nov. 24, 2016

(51) Int. Cl.
*G06F 17/30* (2006.01)
*H04L 12/911* (2013.01)
*H04L 29/08* (2006.01)
*H04L 29/06* (2006.01)

(52) U.S. Cl.
CPC .......... *H04L 47/70* (2013.01); *G06F 17/3089* (2013.01); *H04L 67/02* (2013.01); *H04L 67/10* (2013.01); *H04L 67/20* (2013.01); *H04L 67/28* (2013.01); *H04L 67/42* (2013.01); *H04L 67/125* (2013.01)

(58) Field of Classification Search
CPC ......... H04L 47/70; H04L 67/02; H04L 67/10; G06F 17/3089
See application file for complete search history.

(56) References Cited

U.S. PATENT DOCUMENTS

| 7,620,856 | B2 | 11/2009 | Kagan et al. |
| 8,937,618 | B2 | 1/2015 | Erez et al. |
| 9,098,333 | B1 * | 8/2015 | Obrecht ............... G06F 9/50 |
| 9,298,455 | B1 * | 3/2016 | Kolam ............... H04L 67/2842 |
| 9,477,648 | B1 * | 10/2016 | Carter ............... G06F 17/2247 |
| 9,531,829 | B1 * | 12/2016 | Anand ............... H04L 67/2842 |
| 2009/0222727 | A1 * | 9/2009 | George ............ G06F 17/30861 715/704 |
| 2009/0228782 | A1 * | 9/2009 | Fraser ............... G06F 17/30905 715/234 |
| 2012/0084346 | A1 * | 4/2012 | Mickens ............ G06F 17/30902 709/203 |

(Continued)

*Primary Examiner* — Kevin Bates
*Assistant Examiner* — Mark A Scott
(74) *Attorney, Agent, or Firm* — Fish & Richardson P.C.

(57) ABSTRACT

The present disclosure involves systems, software, and computer implemented methods for optimizing a critical resource path for a web application. One example process includes operations for identifying a visual completeness criteria for the web application. The web application includes a plurality of N resources. The web application is initialized for execution and the network roundtrips of each resource are monitored until the visual completeness criteria is satisfied and a first total elapsed time is determined. A total of N further initializations of the web application are performed, wherein each further initialization is performed while delaying loading of a different one of the N resources during a particular iteration. A particular resource is determined as not relevant to the CRP when the total time elapsed to the visual completeness criteria in the further initialization where the particular resource is delayed is below a threshold amount above the first total elapsed time.

15 Claims, 6 Drawing Sheets

(56) References Cited

U.S. PATENT DOCUMENTS

| | | | |
|---|---|---|---|
| 2013/0041946 A1* | 2/2013 | Joel | G06F 17/30905 709/203 |
| 2013/0097313 A1* | 4/2013 | Zhang | G06F 11/3419 709/224 |
| 2013/0121599 A1* | 5/2013 | Shmouely | H04L 67/02 382/219 |
| 2013/0212465 A1* | 8/2013 | Kovatch | G06F 17/227 715/234 |
| 2013/0226992 A1* | 8/2013 | Bapst | H04L 67/42 709/203 |
| 2014/0052851 A1* | 2/2014 | Nielsen | H04L 43/04 709/224 |
| 2014/0101136 A1* | 4/2014 | Mizuno | G06F 17/30867 707/722 |
| 2014/0115020 A1* | 4/2014 | Colaco | G06F 17/30194 707/827 |
| 2014/0136973 A1* | 5/2014 | Kumar | G06F 17/30902 715/274 |
| 2014/0189714 A1* | 7/2014 | Lawbaugh | H04L 67/00 719/313 |
| 2014/0281918 A1* | 9/2014 | Wei | H04L 67/02 715/234 |
| 2014/0303953 A1* | 10/2014 | Bates | G06Q 30/02 703/13 |
| 2014/0310392 A1* | 10/2014 | Ho | H04L 69/16 709/223 |
| 2015/0026239 A1* | 1/2015 | Hofmann | H04L 67/1095 709/203 |
| 2015/0088968 A1* | 3/2015 | Wei | H04L 67/10 709/203 |
| 2015/0089352 A1* | 3/2015 | Conboy | G06F 12/0862 715/234 |
| 2015/0130820 A1* | 5/2015 | Shu | G06T 1/20 345/502 |
| 2015/0281331 A1* | 10/2015 | Steiner | H04L 69/14 709/203 |
| 2015/0310126 A1* | 10/2015 | Steiner | G06F 17/2247 715/204 |
| 2015/0334041 A1* | 11/2015 | Hedbor | G06F 17/30902 709/203 |
| 2015/0334160 A1* | 11/2015 | Franklin | H04W 8/245 709/203 |
| 2015/0381699 A1* | 12/2015 | Eastham | G06F 17/30887 709/203 |
| 2016/0026611 A1* | 1/2016 | Liu | G06F 17/218 715/234 |
| 2016/0094614 A1* | 3/2016 | Ulupinar | H04L 65/4084 709/219 |
| 2016/0180803 A1* | 6/2016 | Hui | G09G 5/005 715/744 |
| 2016/0306895 A1* | 10/2016 | Kaewell | G06F 17/30902 |

* cited by examiner

| MEASUREMENT NUMBER | DELAYED URL | PAGE LOADING DURATION [MS] | IS UI BLOCKER! |
|---|---|---|---|
| 0 | test_app_baseline | 5184 | FALSE |
| 1 | /exampleapp/uis/clients/ushell-app/shells/Launchpad.html | 20519 | TRUE |
| 2 | /exampleapp/uis/ui5/1/resources/themes/bluecrystal/library.css | 20522 | TRUE |
| 3 | /exampleapp/uis/clients/bootstrap/uis.js | 19707 | TRUE |
| 4 | /landingPage/images/laaunchpad_favicon.ico | 4883 | FALSE |
| 5 | /sap/ui5/1/resources/sap/fiori/messagebundle-preload_en.js?ts=201409032214 | 20518 | TRUE |
| 6 | /core/min.js | 3177 | FALSE |
| 7 | /resources/dfa/help/utils/adaptersHelpPlugin.js | 21997 | TRUE |
| 8 | /exampleapp/uis/ui5/1/resources/ui/core/mimes/logo/logo50x26.png | 2980 | FALSE |

CRITICAL RENDERING PATH OPTIMIZATION

TECHNICAL FIELD

The present disclosure relates to computer-implemented methods, software, and systems for optimizing a critical rendering path of a web application.

BACKGROUND

A web application can include or can refer to different types of resources. Resources can include, for example, scripts, images, style definitions, and other types of resources. A resource such as a script or a style definition can be included inline within the web application. Scripts, style definitions, and other types of resources, such as images, can also be included in the web application by using a reference to an external resource. When the web application is loaded and a reference to the external resource is encountered, a request can be sent to an external server associated with the external resource and the external resource can be retrieved from the external server for use by the web application.

SUMMARY

The present disclosure involves systems, software, and computer implemented methods for optimizing a critical rendering path (CRP) of a web application to achieve faster fulfillment of visual completeness criteria. One example process includes operations for identifying a visual completeness criteria associated with the execution of the web application. The web application includes a plurality of resources (N) to be loaded upon initialization. The visual completeness criteria defines an event occurring during the initialization. The web application is initialized for execution and the network roundtrips of each resource are monitored until the visual completeness criteria is satisfied and a first total elapsed time is determined. A total of N further initializations of the web application are iteratively performed, wherein each of the N further initializations are performed while delaying loading of a different individual one of the N resources during a particular iteration. A particular resource is determined as not relevant to the CRP when the total time elapsed to the visual completeness criteria in the particular further initialization where the particular resource is delayed is below a threshold amount above the first total elapsed time.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1D illustrates an example optimization report.

DETAILED DESCRIPTION

A web application can include a number of resources, such as images, scripts, and style definitions, that are loaded when the web application is initialized. Some of the resources may be part of a critical rendering path (CRP), in that the resources are required for meeting a visual completeness criteria for the web application, such as a portion of the web application being visibly complete to the user. Determining which resources are part of the CRP can be beneficial, in that the web application can be re-configured to load resources that are not part of the CRP after resources that are part of the CRP. Re-ordering resource loading can result in the visual completeness criteria being met sooner when the web application is initialized, as compared to initialization occurring using an original load order. Manually determining which resources are part of the CRP for a web application may take a number of hours or even days to complete, especially for web applications that include a large number (e.g., dozens, hundreds) of resources. As described below, an automatic approach for determining critical resources can be used to determine a resource load order for either a newly-developed or a recently-modified web application.

Figure 1A:
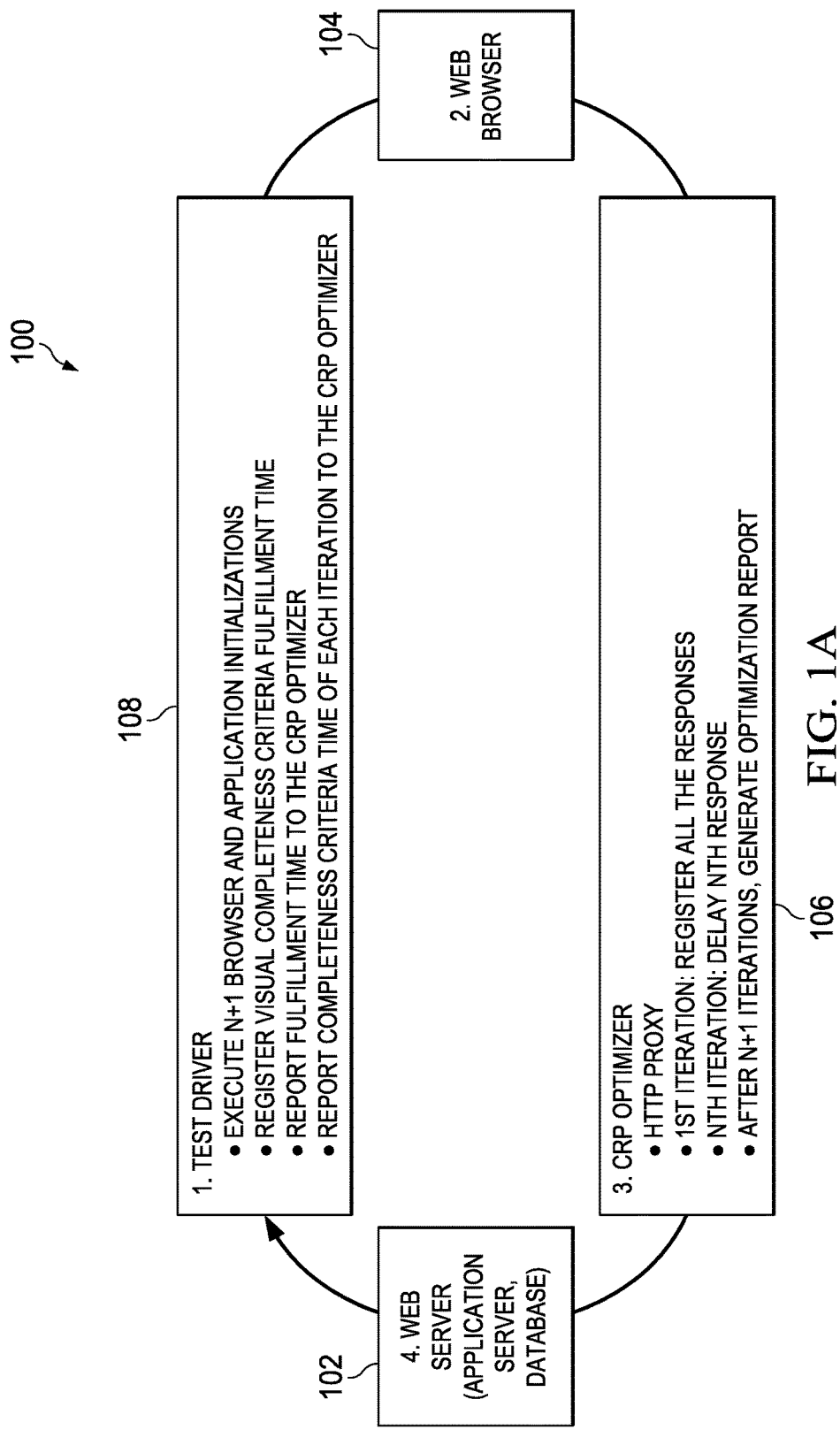
FIG. 1A is a block diagram illustrating an example system for optimizing a critical rendering path (CRP) of a web application.

FIG. 1A is a block diagram illustrating an example system 100 for optimizing a critical rendering path of a web application. As described in more detail below, a web server 102 can receive a request from a web browser 104 running on a client device to present the web application in the web browser 104. The client device can include a CRP optimizer 106 and a test driver 108.

The CRP optimizer 106 can be configured as an HTTP (HyperText Transfer Protocol) proxy, for example. The web browser 104 can be configured to be associated with the proxy. The CRP optimizer 106 can be configured to capture HTTP traffic associated with the loading of the web application. The CRP optimizer 106 can, for example, determine a count of N resources that are loaded during a test loading of the web application.

The CRP optimizer 106 can communicate the count of N resources to the test driver 108. The test driver 108 can be configured to launch the web browser 104 and clear a browser cache associated with the web browser 104. The test driver 108 can be configured to load the web application N+1 times. For the first iteration, the test driver 108 can determine a base visual completeness time which is a time that has elapsed until a visual completeness criteria for the web application has been fulfilled. As described in more detail below, the visual completeness criteria can define an event occurring during the initialization of the web application, such as completion of a document object model (DOM) for the web application, appearance of a particular element within the web application, or a predefined event occurring after loading of the web application.

For the remaining N iterations, the CRP optimizer 106 can delay loading of a particular one of the N resources. The test driver 108 can determine a visual completeness time for each of the N iterations. The test driver 108 can communicate the base visual completeness time and the visual completeness time determined for each iteration to the CRP optimizer 106.

The CRP optimizer 106 can generation an optimization report which indicates, for each respective resource, whether the respective resource is a critical resource. For example, a critical resource can be a resource which is required for meeting the visual completeness criteria for the web application. As described in more detail below, a resource can be identified as a critical resource, for example, when the delaying of the resource resulted in a delaying of reaching the visual completeness criteria for the web application. The optimization report can include, for some or all critical resources, one or more suggestions for optimizing the respective critical resource. As described in more detail below, the optimization report can be received and processed by a build server and/or a developer of the web application.

Figure 1B:
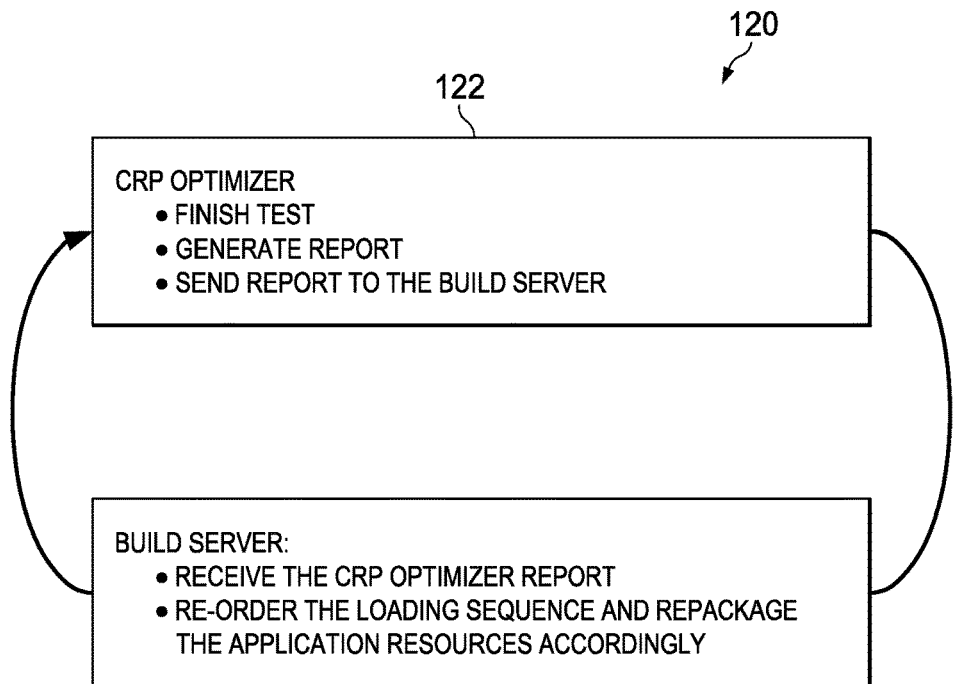
FIG. 1B is a block diagram of an example system illustrating the integration of a CRP optimizer with a build server.

FIG. 1B is a block diagram of an example system 120 illustrating the integration of a CRP optimizer 122 with a build server 124. The CRP optimizer 122 can provide an optimization report to the build server 124. The build server 124 can be configured to automatically receive and parse the optimization report. For example, the build server 124 can automatically re-order a load sequence of resources for the web application based on the optimization report. For example, the build server 124 can be configured to move resources that are flagged in the optimization report as non-critical resources to the end of the load sequence. The build server 124 can re-build the web application using the re-ordered load sequence.

Figure 1C:
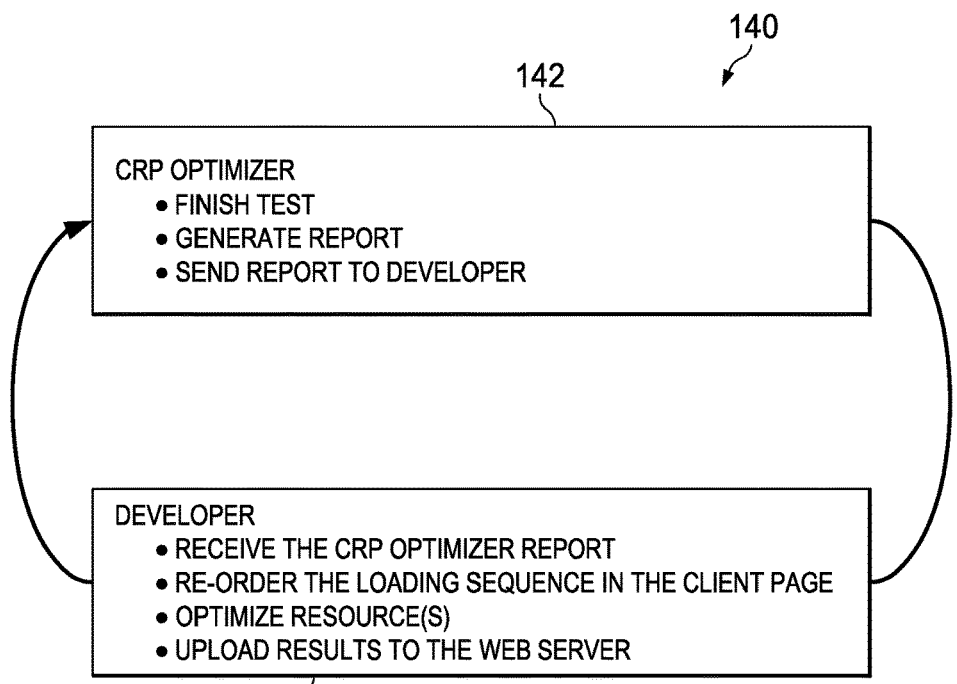
FIG. 1C is a block diagram of an example system illustrating a CRP optimizer interfacing with a developer of a web application.

FIG. 1C is a block diagram of an example system 140 illustrating a CRP optimizer 142 interfacing with a developer 144 of the web application. The CRP optimizer 142 can provide the optimization report to the developer 144. The developer 144 can manually re-order a load sequence of the web application, such as by moving non-critical resources to the end of the load sequence. The developer 144 can perform one or more optimizations (e.g., of one or more critical resources), based on optimization suggestions included in the optimization report. The developer 144 can submit a request for a rebuild of the web application to use the re-ordered load sequence and the optimized resources. The rebuilt application can be uploaded to a web server, for example.

FIG. 1D illustrates an example optimization report 160. A row 162 of the optimization report 160 indicates a base visual completeness time (e.g., 5184 ms) for reaching a visual completion criteria during a loading of the web application. Rows 164-178 correspond to first through ninth loading iterations, during which loading of one of first through ninth resources was delayed, respectively. Each row 164-178 includes, for example, a URL (Uniform Resource Locator) of the resource which was delayed, a page (e.g., application) loading duration for the iteration, and an indication of whether the resource is a "user interface blocker" (which indicates whether the resource is a critical resource). If the delaying of a respective resource resulted in a delay of the visual completeness of the user interface of the web application, the resource can be flagged as a UI blocker, for example.

For example, the row 164 corresponds to a first iteration during which loading of a first resource having a URL of "/exampleapp/uis/clients/ushell-app/shells/Launchpad.html" is delayed. The loading of the first resource can be delayed for a predetermined amount of time, such as twenty seconds (e.g., 20,000 ms). The first resource is flagged as being a UI blocker (e.g., critical resource) based, for example, on a page loading time of 20,519 ms being a threshold amount greater than the base visual completeness time indicated by the row 162. In other words, the row 164 may indicate that the delaying of the loading of the first resource by approximately twenty seconds blocked the loading of the web application for approximately twenty seconds, thus indicating that the first resource is a UI blocker that is necessary for obtaining the visual completeness criteria of the web application.

As another example, the row 170 corresponds to a fourth iteration during which loading of a fourth resource having a URL of "/landingPage/images/launchpad_favicon.ico" is delayed. The fourth resource is flagged as not being a UI blocker based, for example, on a page loading time 4,883 ms not being a threshold amount greater than the base visual completeness time. In other words, row 170 may indicate that the delaying of the loading of the fourth resource did not result in a delay in reaching the visual completeness criteria for the web application, thus indicating that the fourth resource is not a critical resource.

Figure 2:
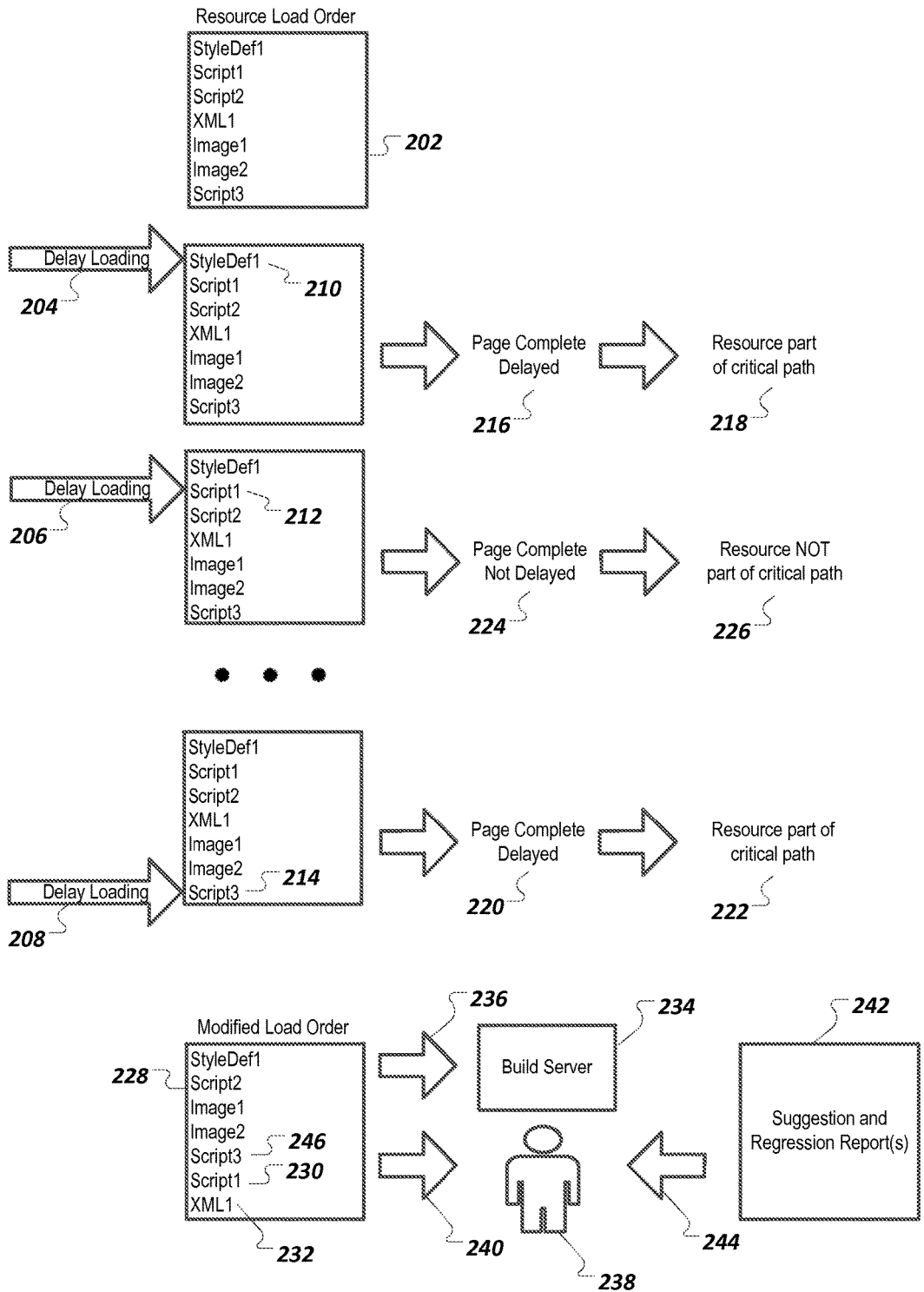
FIG. 2 illustrates the modification of an example resource load order for a web application.

FIG. 2 illustrates the modification of an example resource load order for a web application. A resource list 202 illustrates a resource load order for a web application. For example, the resource list 202 indicates that the following seven resources will be loaded by the web application in the following order: "StyleDef1 ", "Script1", "Script2", "XML1", "Image1", "Image2", and "Script3".

A monitoring component, such as the CRP optimizer 106 described above with respect to FIG. 1, can initialize the web application for execution and monitor the network round-trips of each resource in the resource list 202 until a predefined visual completeness criteria is satisfied and a first total elapsed time is determined.

The monitoring component can iteratively perform seven further initializations of the web application (e.g., one initialization for each resource included in the resource list 202). For each iteration, the loading of a different resource is delayed. For example, arrows 204, 206, and 208 illustrate the delayed loading of first 210, second 212, and seventh 214 resources in the resource list 202 during first, second, and seventh further initialization iterations, respectively.

A resource selected for delayed loading for a given iteration can be referred to as the delayed resource for the iteration. For each iteration, a determination is made as to whether delaying the loading of the delayed resource results in a delay of reaching the visual completeness criteria during the initialization iteration. When a delay in reaching the visual completeness criteria occurs in the initialization iteration, a determination can be made that the delayed resource is part of the critical resource path. When a delay in reaching the visual completeness criteria does not occur during the initialization iteration, a determination can be made that the delayed resource is not part of the critical resource path.

For example, as illustrated by note 216, a determination is made that the delaying of the first resource 210 during the first initialization iteration results in a delay in reaching the visual completeness criteria during the first iteration. Accordingly, the monitoring component can determine that the first resource 210 is part of the critical resource path (e.g., as illustrated by a note 218). Similarly, as illustrated by note 220, a determination is made that the delaying of the seventh resource 214 during the seventh initialization iteration results in a delay in reaching the visual completeness criteria during the seventh iteration. Accordingly, the monitoring component can determine that the seventh resource 214 is part of the critical resource path (e.g., as illustrated by a note 222). A note 224 indicates that the delaying of the second resource 212 during the second iteration does not result in a delay in reaching the visual completeness criteria during the second iteration. Accordingly, a determination is made that the second resource 212 is not part of the critical resource path (e.g., as indicated by a note 226).

After the seventh iteration, the resource list 202 can be reordered to create a reordered resource list 228. For example, each resource that has been determined to not be part of the critical resource path can be moved to the end of the resource list 228. For example, the second resource 212 in the resource list 202 has been moved to be a new sixth resource 230 in the reordered resource list 228. A fourth resource (e.g., "XML1") in the resource list 202 has also been moved, to be a new seventh resource 232 in the reordered resource list 228 (e.g., in response to a determination, in a fourth initialization iteration, that the fourth resource is not part of the critical resource path).

The reordered resource list 228 can be automatically provided to a build server 234 (e.g., as illustrated by an arrow 236), for automatic reconfiguration of the web application by the build server 234. The reordered resource list 228 can also or instead be provided to a developer 238 (e.g., as illustrated by an arrow 240), such as for manual reconfiguration and/or reporting purposes.

In some implementations, suggestion and/or regression reports 242 are provided to the developer 238 (e.g., as illustrated by an arrow 244). The reports 242 can include regression information, for example, such as whether the CRP has changed (e.g., additional or changed resources) or the resource list in general has changed, for the web application, since the last build performed by the build server 234. As another example, the reports 242 can include suggestions for optimization of critical resources such as the first resource 210 or the seventh resource 214. For example, the reports 242 can indicate that one or more text resources (e.g., scripts, style definitions) are more than a predefined number of bytes. As another example, the reports 242 can indicate that the load time of one or more critical resources is more than a threshold amount of time. The threshold amount of time can vary by content type (e.g., text, image) and can be a predefined amount of time for each content type or can be based on an average load time for content items of a particular content type. As yet another example, the reports 242 can indicate that more than a predefined number of resources have been identified as critical resources.

The developer 238 can perform one or more actions in response to the reports 242. For example, when the CRP includes too many resources, the developer 238 can combine multiple resources into a single resource (e.g., multiple script files can be merged into a single script file). When a resource is too large, the developer 238 can split the resource into multiple resource files. As another example, the developer 238 can identify one or more critical portions of the resource and one or more non-critical portions of the resource, split the resource into critical and non-critical resources, and move the non-critical resources to a later loading stage or otherwise postpone the loading of the non-critical resources. As other examples, the developer 238 may choose to inline a resource (e.g., move the contents of an external resource to be inline with web application content) or modify a non-critical resource, such as to rewrite the code of the resource so as to achieve code reduction.

In some implementations, when N resources are included in a web application, N−1 iterations are performed, rather than N iterations. For example, for the web application that is associated with the resource list 202, six iterations may be performed, rather than seven. For example, six iterations may be performed since the moving (or non-moving) of the seventh resource 214 may not affect timing of reaching the visual completeness criteria, since the seventh resource would be either the last resource in a list of critical resources or the first resource in a list of non-critical resources. For instance, in the illustrated example, the seventh resource 214, which was identified as a critical resource, is positioned in the reordered resource list 228, after the moving of non-critical resources, as a new fifth resource 246. The new fifth resource 246 is the last of a list of critical resources in the reordered resource list 228. By comparison, if the seventh resource 214 had been determined to be a non-critical resource, the moving of the seventh resource 214 to the end of the reordered resource list 228 (e.g., after the new seventh resource 232) would position the seventh resource 214 as the last resource of a list of non-critical resources in the reordered resource list 228). However, if the seventh resource 214 had simply not been moved, the seventh resource 214 would be positioned, as mentioned, as the new fifth resource 246 and would be the first of a list of non-critical resources.

Figure 3:
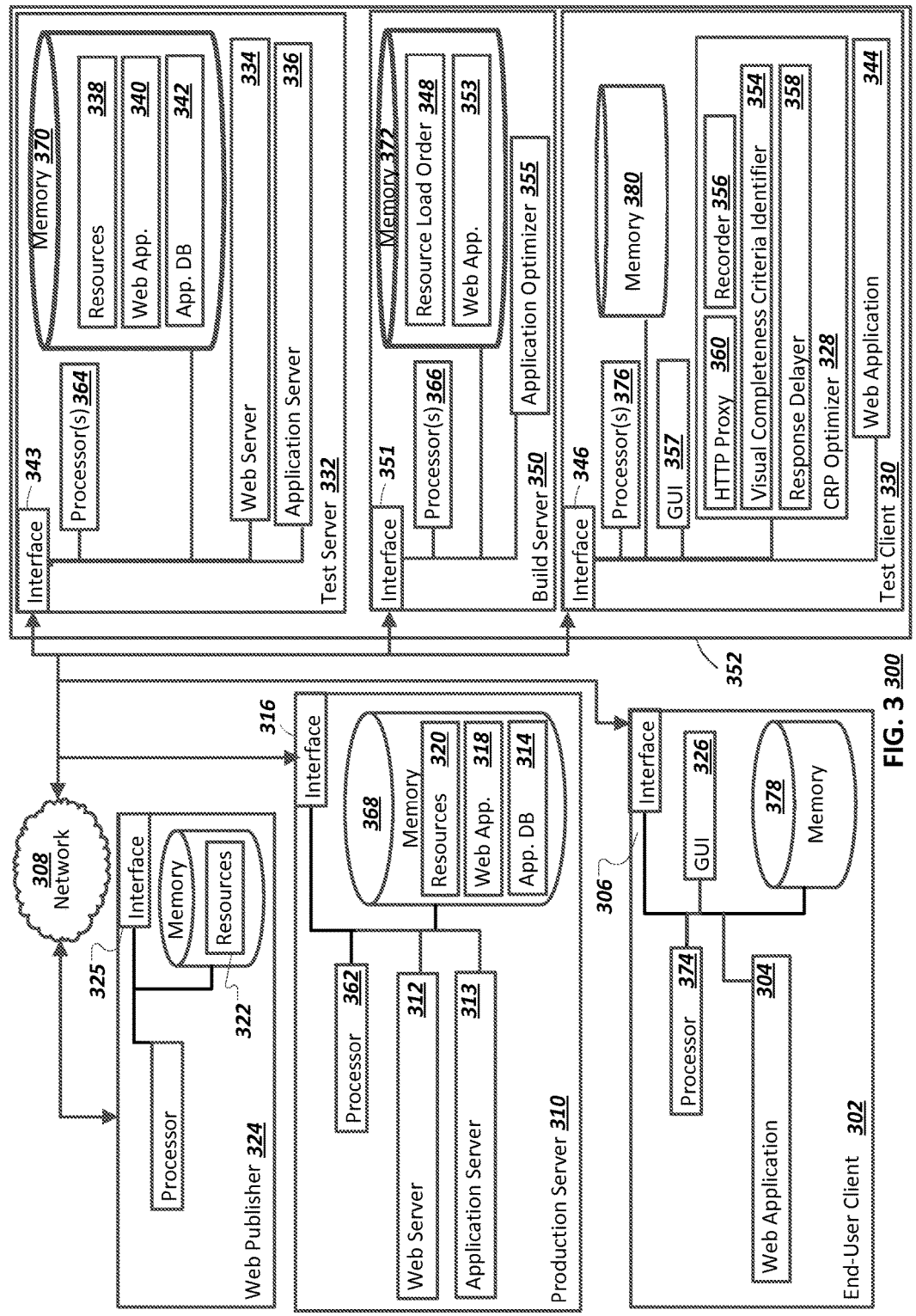
FIG. 3 is a block diagram illustrating an example system for optimizing a critical rendering path of a web application.

FIG. 3 is a block diagram illustrating an example system 300 for optimizing a critical rendering path of a web application. A user of an end-user client device 302 can request execution of a web application 304. The web application 304 may be executed within a browser running on the end-user client device 302, for example. In response to the user request, the end-user client device 302 can submit a request, using an interface 306 and over a network 308, to a production server 310, for the web application 304. The production server 310 includes or is otherwise associated with a web server 312 and an application server 313. The application server 313 can, for example, provide business logic for execution of the web application 304, including access to an application database 314. The web server 312 can use an interface 316 to provide a copy of a web application 318 to the end-user client device 302, to be used as the web application 304 on the end-user client device 302.

The web application 304 can be initialized (e.g., loaded) by the browser after the web application 304 has been received from the web server 312. The web application 304 can refer to a number of resources (e.g., static resources) that are to be loaded when the web application 304 is initialized. Some or all resources referenced by the web application 304 can refer to a resource included in a resources repository 320 associated with the production server 310, for example. As another example, some resources referenced by the web application 304 can be included in resources 322 provided by one or more third party web publishers 324. Resources referenced by the web application 304 can include, for example, one or more scripts, images, style definitions, embedded web content, audio, video, fonts, documents, or any other type of resource.

The web application 304 can be configured to load the resources referenced by the web application 304 in a particular order (e.g., a load order). For example, a request for each resource referenced in the web application 304 can be sent to a corresponding server (e.g., the production server 310 or a third party publisher 324, using the interface 316 or an interface 325, respectively). The corresponding server can send the requested resource to the client application 304. The browser can process a resource once the resource has been received. For example, a script can be executed, an image can be rendered (e.g., on a GUI (Graphical User Interface) 326), or a style definition can be applied to one or more elements of the web application 304. The browser can build a Document Object Model (DOM) as the web application 304 is initialized.

A developer of the web application 304 can define a visual completeness criteria for the web application 304 which defines an event occurring during initialization of the web application 304. For example, the visual completeness criteria can be that all web application content above a fold line is visible (e.g., where the fold line divides content that is visible without scrolling from content that is visible only after scrolling). As another example, the visual completeness criteria can be that some or all web application elements are responsive to user interaction. In general, "visual completeness" can represent a desired perceived performance for the web application 304 (e.g., a performance in terms of visibility and/or usability that the developer desires the user to perceive or experience during initialization of the web application 304). Other types of visual completeness criteria can be defined, as described in more detail below.

The developer of the web application 304 may desire to configure the web application 304 so that the visual completeness criteria is met as soon as possible during initialization of the web application 304. The visual completeness criteria may be met, for example, after resources necessary to meet the visual completeness criteria have been downloaded. Resources that are necessary to render the initial view of the web application 304 to meet the visual completeness criteria can be referred to as critical resources belonging to the CRP for the web application 304. Resources that are not necessary to render the initial view of the web application 304 can be referred to as non-critical resources with respect to the CRP for the web application 304.

The developer can use a CRP optimizer 328 included in a test client 330 and a test server 332 to automatically determine which resources of the web application 304 are part of the CRP for the web application 304. The test server 332 can provide similar functionality as the production server 310. For example, a web server 334, an application server 336, resources 338, a web application 340, and an application database 342 correspond to the web server 312, the application server 313, the resources 320, the web application 318, and the application database 314, respectively. The web server 334 can use an interface 343 to provide a copy of the web application 340 to the test client 330 as a web application 344, for example. The test client 330 can receive the copy of the web application 340 using an interface 346.

The CRP optimizer 328 can be executed as a regular part of ongoing development of the web application 344. For example, the CRP optimizer 328 can be executed after a change has been made to the web application 344. The CRP optimizer 328 can be used for other web applications, such as a newly developed web application. The automatic optimization provided by the CRP optimizer 328 can save significant development time for new and revised applications, as compared to a manual CRP optimization approach.

The CRP optimizer 328, the test client 330, the test server 332, and a build server 350 can be included, for example, in a single-user performance measurement system 352 that is part of an integration/testing system. The single-user performance measurement system 352 can provide an environment that is isolated from the production server 310, for example. For example, the web application 344 can be configured to send requests to the test server 330 rather than the production server 310, so as to not disturb the production server 310. In some implementations, the single-user performance measurement system 352 uses the network 308. In other implementations, the single-user performance measurement system 352 uses a separate network (not shown) instead of or in addition to the network 308. A separate network may be used, for example, to isolate the single-user performance measurement system 352 from external network factors.

The CRP optimizer 328 can automate optimization of the CRP for the web application 344. The CRP optimizer 328 can be a browser plug-in, for example. A developer can manually initiate execution of the CRP optimizer 328. As another example, an automated testing system can automatically execute the CRP optimizer 328.

As described in more detail below, the CRP optimizer 328 can generate a modified resource load order for the web application 344. The modified resource load order can include a reordering of the resources for the web application 344 with non-critical resources being moved to the end of the load order and critical resources being at the beginning of the load order. A modified resource load order 348 can be provided to the build server 350 by the CRP optimizer 328, for example.

The build server 350 can receive the modified resource load order 348 using an interface 351 and an application optimizer 355 included in the build server 350 can parse the modified resource load order 348 and use the modified resource load order 348 to build a web application 353 that is a reconfigured version of the web application 344 configured to load the resources of the web application 344 in an order specified by the modified resource load order 348. The modified resource load order 348 can be a file descriptor or some other resource order listing.

The build server 350 can provide the reconfigured web application 353 to the test server 332 as an updated web application 340 and in turn, the updated web application 340 can be provided to the test client 344 as an updated web application 344, for further testing. The CRP optimizer 328 can perform another iteration of testing to determine whether additional optimizations are detected. If additional optimizations are detected, the CRP optimizer can provide an updated resource load order 348 to the build server 350 for an additional rebuilding of the web application 353. The testing cycle can thus continue until no further optimizations are detected.

When no additional optimizations are detected, the most recently built version of the web application 353 can be deployed to the production server 310 as a new version of the web application 318, and provided to the client device 302 as a new version of the web application 304, in response to a request for the web application 304 that is received by the production server 310 after deployment of the new version of the web application 318.

In some implementations, the modified resource load order is provided to a developer of the web application 344 in addition to or instead of being provided to the build server 350. The developer can manually modify the resource load order for the web application 344, for example. A report generated by the CRP optimizer 328 can be provided to the developer of the web application 328, for example. The report can also include optimization suggestions, such as for critical resources, and regression information, as described in more detail below.

A visual completeness criteria identifier 354 included in the CRP optimizer 328 can identify a visual completeness criteria for the web application 344. For example, the visual completeness criteria identifier 354 can identify pre-configured visual completeness criteria that is stored on the test client 330 and associated with the web application 344 or with the browser. As another example, the visual completeness criteria identifier 354 can request and receive visual completeness criteria from the test server 332 or the build server 350. As yet another example, the visual completeness criteria identifier 354 can prompt the developer to enter visual completeness criteria for the web application 344.

The CRP optimizer 328 can determine a number N of resources that are included in (e.g., referenced by) the web application 344 and to be loaded upon initialization of the web application 344. The CRP optimizer 328 can initialize the web application 344 for execution and a recorder 356 included in the CRP optimizer 328 can monitor the network roundtrips of each of the N resources. The CRP optimizer 328 can determine a time during the initialization at which the visual completeness criteria has been met on a GUI 357 (e.g., based on detection of the occurrence of an event associated with the visual completeness criteria) and can determine a base completion time for the web application 344 which represents an elapsed amount of time before the visual completeness criteria is satisfied.

The CRP optimizer 328 can automatically perform N further iterations of initializing the web application 344. During each iteration, the loading of a different, respective resource of the N resources is delayed by a response delayer 358. The response delayer 358 can use an HTTP (Hyper Text Transfer Protocol) proxy 360, for example. The response delayer 358 can use the HTTP proxy 360 to pause a server response that is responsive to a request for the respective resource. The response delayer 358 can delay loading of the respective resource to determine whether the respective resource is a critical resource based on whether the resource is a "UI (User Interface) blocker" with respect to the current iteration.

For example, a completion time to meet the visual completeness criteria can be determined for the iteration and compared to the base completion time. If the delaying of the loading of the respective resource does not cause a delay in reaching the visual completeness criteria (e.g., the difference between the base completion time and the completion time for the iteration is less than a predefined or dynamically-determined threshold), the CRP optimizer 328 can determine that the respective resource is not a critical resource, since the visual completeness criteria was met, without delay, without completion of the loading of the respective resource. If the delaying of the loading of the respective resource causes a delay in reaching the visual completeness criteria (e.g., the difference between the base completion time and the completion time for the iteration is more than a threshold), the CRP optimizer 328 can determine that the respective resource is a critical resource and part of the CRP for the web application 344, since the CRP optimizer 328 can determine that the delayed loading of the respective resources delays (or blocks) the event associated with the visual completeness criteria from occurring.

As described above, the CRP optimizer 328 can provide a modified resource load order to the build server 350 and/or to a developer, as a suggestion to modify the web application 344 to postpone loading of non-critical resources. Non-critical resources can be considered, before re-ordering, to be "bandwidth stealers" in that they consume bandwidth that could otherwise be used to load critical resources. The postponing of the loading of non-critical resources can free up bandwidth for the loading of critical resources. Postponing can include moving the loading of the non-critical resources to a later loading stage, as discussed above. Postponing can also include causing the non-critical resource to be loaded when a free connection is available or upon receiving a user request (e.g., "lazy loading").

As used in the present disclosure, the term "computer" is intended to encompass any suitable processing device. For example, although FIG. 3 illustrates a single test server 332 and production server 310, environment 300 can be implemented using two or more test servers 332 and/or production servers 310, as well as computers other than servers, including a server pool. Indeed, the test server 332, the production server 310, or the build server 350 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the test server 332, the production server 310, or the build server 350 may be adapted to execute any operating system, including Linux, UNIX, Windows, Mac OS®, Java™, Android™, iOS or any other suitable operating system. According to one implementation, the test server 332, the production server 310, or the build server 350 may also include or be communicably coupled with an e-mail server, a Web server, a caching server, a streaming data server, and/or other suitable server.

The network interfaces 306, 316, 325, 343, 346 and 351 are used by the end-user client 302 device, the production server 310, the third party publisher 324, the test client 330, the test server 332, and the build server 350, respectively, for communicating with other systems in a distributed environment—including within the system 300—connected to the network 308. Generally, the network interfaces 306, 316, 325, 343, 346 and 351 each comprise logic encoded in software and/or hardware in a suitable combination and operable to communicate with the network 308. More specifically, the network interfaces 306, 316, 325, 343, 346 and 351 may each comprise software supporting one or more communication protocols associated with communications such that the network 308 or interface's hardware is operable to communicate physical signals within and outside of the illustrated system 300.

The production server 310, the build server 350, and the test server 332 respectively include one or more processors 362, 364, or 366. Each set of one or more processors 362, 364, or 366 may be a central processing unit (CPU), a blade, an application specific integrated circuit (ASIC), a field-programmable gate array (FPGA), or another suitable component. Generally, each processor in the processors 362, 364, or 366 executes instructions and manipulates data to perform the operations of the corresponding server. For example, the processors 362 execute the functionality required to receive and respond to requests from the end-user client 302, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 3 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The production server 310, the build server 350, and the test server 332 respectively includes memory 368, 370, or 372. In some implementations, the production server 310, the build server 350, and/or the test server 332 include multiple memories. Each of the memories 368, 370, and 372 may include any type of memory or database module and may take the form of volatile and/or non-volatile memory including, without limitation, magnetic media, optical media, random access memory (RAM), read-only memory (ROM), removable media, or any other suitable local or remote memory component. Each of the memories 368, 370, and 372 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the respective server.

The end-user client 302 and the test client 330 may each generally be any computing device operable to connect to or communicate via the network 308 using a wireline or wireless connection. In general, the end-user client 302 and the test client 330 each comprise an electronic computer device operable to receive, transmit, process, and store any appropriate data associated with the system 300 of FIG. 3. The end-user client 302 and the test client 330 can each include one or more client applications, such as the web application 304 or the web application 344, respectively. A client application is any type of application that allows the end-user client 302 or the test client 330 to request and view content on the respective end-user client 302 or test client 330. In some implementations, a client application can use parameters, metadata, and other information received at launch to access a particular set of data from an enterprise server. In some instances, a client application may be an agent or client-side version of the one or more enterprise applications running on the enterprise server.

The end-user client 302 and the test client 330 respectively include one or more processors 374 and 376. Each processor 374 and 376 may be a central processing unit (CPU), an application specific integrated circuit (ASIC), a field-programmable gate array (FPGA), or another suitable component. Generally, each processor 374 or 376 executes instructions and manipulates data to perform the operations of the respective client device. Specifically, each processor 374 or 376 executes the functionality required to send requests to the production server 310 or the test server 330, respectively.

The end-user client 302 and the test-client 330 are each generally intended to encompass any client computing device such as a laptop/notebook computer, wireless data port, smart phone, personal data assistant (PDA), tablet computing device, one or more processors within these devices, or any other suitable processing device. For example, the end-user client 302 or the test-client 303 may comprise a computer that includes an input device, such as a keypad, touch screen, or other device that can accept user information, and an output device that conveys information associated with the operation of the end-user client 302 or the test client 330, including digital data, visual information, or a graphical user interface (GUI).

The GUI 326 of the end-user client 302 and the GUI 357 of the test client 330 each interface with at least a portion of the system 300 for any suitable purpose, including generating a visual representation of the web application 304 or the web application 344, respectively. In particular, the GUI 326 and the GUI 357 may be used to view and navigate various Web pages. Generally, the GUI 326 and the GUI 357 provide the user with an efficient and user-friendly presentation of business data provided by or communicated within the system. The GUI g126 and the GUI 357 may each comprise a plurality of customizable frames or views having interactive fields, pull-down lists, and buttons operated by the user. The GUI g126 and the GUI 357 each contemplate any suitable graphical user interface, such as a combination of a generic web browser, intelligent engine, and command line interface (CLI) that processes information and efficiently presents the results to the user visually.

Memory 378 included in the end-user client 302 and memory 380 included in the test client 330 may each include any memory or database module and may take the form of volatile or non-volatile memory including, without limitation, magnetic media, optical media, random access memory (RAM), read-only memory (ROM), removable media, or any other suitable local or remote memory component. The memory 378 and the memory 380 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user clients 302 and test clients 330 associated with, or external to, the system 300. For example, while the illustrated system 300 includes one end-user client 302 and one test client 330, alternative implementations of the system 300 may include multiple end-user clients 302 and/or multiple test clients 330 communicably coupled to the network 308, or any other number suitable to the purposes of the system 300. Additionally, there may also be one or more additional end-user clients 302 and/or test clients 330 external to the illustrated portion of system 300 that are capable of interacting with the system 300 via the network 308. Further, the term "client", "client device" and "user" may be used interchangeably as appropriate without departing from the scope of this disclosure. Moreover, while the end-user client 302 is described in terms of being used by a single user, this disclosure contemplates that many users may use one computer, or that one user may use multiple computers.

Figure 4:
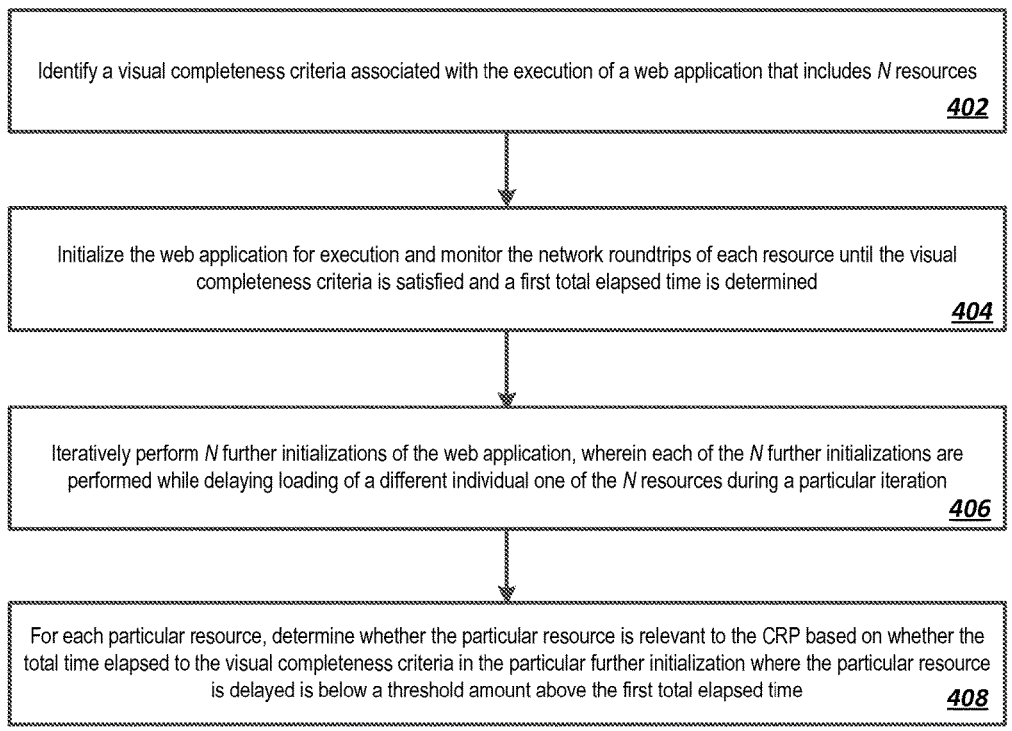
FIG. 4 is a flowchart of an example method for optimizing a critical rendering path of a web application.

FIG. 4 is a flowchart of an example method 400 for optimizing a CRP for a web application. For clarity of presentation, the description that follows generally describes method 400 and related methods in the context of FIG. 4. However, it will be understood that method 400 and related methods may be performed, for example, by any other suitable system, environment, software, and hardware, or a combination of systems, environments, software, and hardware, as appropriate. For example, the CRP optimizer server 404 can be used to execute method 400 and related methods.

At 402, a visual completeness criteria associated with the execution of a web application is identified. The web application includes a plurality of resources (N) to be loaded upon initialization of the web application. The visual completeness criteria defines an event occurring during the initialization of the web application. For example, the visual completeness criteria can be associated with completion of a document object model (DOM) for the web application, appearance of a particular element within the web application, or a predefined event occurring after loading of the web application. Suitable automated monitoring techniques can be used to identify when the visual completeness criteria is met after it is set.

At 404, the web application is initialized for execution without modification, where the network roundtrips of each of N resources are monitored until the visual completeness criteria is satisfied and a first total elapsed time is determined.

At 406, a total of N further initializations of the web application are iteratively performed, wherein each of the N further initializations are performed while delaying loading of a different individual one of the N resources during a particular iteration. Delaying the resource can be performed via an HTTP proxy pause of the server response responsive to a request for the resource.

At 408, for each particular resource, a determination is made as to whether the particular resource is relevant to the CRP based on whether the total time elapsed to the visual completeness criteria in the particular further initialization where the particular resource is delayed is below a threshold amount above the first total elapsed time. The threshold can represent a multiple of a standard deviation from an average total time elapsed to the visual completeness criteria.

In response to determining that a particular resource is not relevant, a suggestion can be provided (e.g., to a developer) to postpone the loading of the particular resource until a time after the visual completeness criteria occurs. As another example, in response to determining that a particular resource is not relevant, the web application can be automatically modified to postpone the loading of the particular resource until a time after the visual completeness criteria occurs. Postponing a particular resource can include, for example, moving the loading to a later stage, causing the particular resource to be loaded when a free connection is available, or causing the particular resource to be loaded upon receiving a user request.

A determination can be made that a particular resource is relevant to the CRP based on the total time elapsed to the visual completeness criteria in the particular further initialization where the particular resource is delayed being above a threshold amount above the first total elapsed time. In response to determining that a particular resource is relevant to the CRP, one or more optimizations to be performed upon the particular resource can be identified. A suggestion of one or more identified optimizations can be presented to a user and/or instructions to automatically perform the at least one identified optimization can be sent (e.g., to a build server).

The preceding figures and accompanying description illustrate example processes and computer-implementable techniques. But environment 300 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 300 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for optimizing a critical rendering path (CRP) of a web application, the method comprising:
    identifying a visual completeness criteria associated with execution of a web application, wherein the visual completeness criteria comprises a predefined event occurring during loading of the web application, the predefined event associated with a completed presentation of at least a predetermined portion of a user interface associated with the web application, the web application including a plurality of N resources to be loaded upon initialization in a first load sequence, and wherein the visual completeness criteria defines an event occurring during the initialization, where N is a positive integer;
    initializing the web application for execution, wherein the network roundtrips of each resource are monitored until the visual completeness criteria is satisfied and a first total elapsed time is determined;
    iteratively performing N further initializations of the web application, wherein each of the N further initializations are performed while delaying loading of a different individual one of the N resources during a particular iteration, and wherein a particular resource is determined as not relevant to the CRP when the total time elapsed to the visual completeness criteria in the particular further initialization where the particular resource is delayed is below a threshold amount above the first total elapsed time, and wherein a particular resource is determined as relevant to the CRP when the total time elapsed to the visual completeness criteria where the particular resource is delayed above a threshold amount above the first total elapsed time; and
    after completing the iterative performance of the N further initializations, automatically modifying the web application by re-ordering the first load sequence of the N resources into a revised second load sequence for the web application based on the determination of the relevant and not relevant resources.

2. The method of claim 1, further comprising automatically modifying the web application by postponing the loading of the particular not relevant resources in the revised second load sequence until after the loading of each of the relevant resources, wherein the visual completeness criteria occurs after each of the relevant resources are loaded.

3. The method of claim 2, wherein postponing includes at least one of (1) moving the loading of the not relevant resource to a later stage within the revised second load sequence, (2) causing the particular not relevant resource to be loaded at runtime when a free connection is available, and (3) causing the particular not relevant resource to be loaded only after receiving a user request associated with the particular not relevant resource.

4. The method of claim 1, further comprising in response to determining that a particular resource is relevant, identifying at least one optimization to be performed upon the particular resource.

5. The method of claim 1, wherein delaying the resource is performed via an HTTP proxy pause of a server response responsive to a request for the resource.

6. The method of claim 1, wherein the threshold amount represents a multiple of a standard deviation from an average total time elapsed to the visual completeness criteria.

7. The method of claim 1, wherein re-ordering the first load sequence of the N resources into the revised second load sequence for the web application based on the determination of the relevant and not relevant resources comprises generating the revised second load sequence by moving resources determined to be not relevant to the CRP towards an end of the revised second load sequence and moving resources determined to be relevant to the CRP towards a beginning of the revised second load sequence.

8. A system for optimizing a critical rendering path (CRP) of a web application comprising:
one or more computers associated with an enterprise portal; and
a computer-readable medium coupled to the one or more computers having instructions stored thereon which, when executed by the one or more computers, cause the one or more computers to perform operations comprising:
identifying a visual completeness criteria associated with execution of a web application, wherein the visual completeness criteria comprises a completion of a document object model (DOM) for the web application, the web application including a plurality of N resources to be loaded upon initialization in a first load sequence, and wherein the visual completeness criteria defines an event occurring during the initialization, where N is a positive integer;
initializing the web application for execution, wherein the network roundtrips of each resource are monitored until the visual completeness criteria is satisfied and a first total elapsed time is determined;
iteratively performing N further initializations of the web application, wherein each of the N further initializations are performed while delaying loading of a different individual one of the N resources during a particular iteration, and wherein a particular resource is determined as not relevant to the CRP when the total time elapsed to the visual completeness criteria in the particular further initialization where the particular resource is delayed is below a threshold amount above the first total elapsed time, and wherein a particular resource is determined as relevant to the CRP when the total time elapsed to the visual completeness criteria where the particular resource is delayed above a threshold amount above the first total elapsed time; and
after completing the iterative performance of the N further initializations, automatically modifying the web application by re-ordering the first load sequence of the N resources into a revised second load sequence for the web application based on the determination of the relevant and not relevant resources.

9. The system of claim 8, further comprising automatically modifying the web application by postponing the loading of the particular not relevant resources in the revised second load sequence until after the loading of each of the relevant resources, wherein the visual completeness criteria occurs after each of the relevant resources are loaded.

10. The system of claim 9, wherein postponing includes at least one of (1) moving the loading of the not relevant resource to a later stage within the revised second load sequence, (2) causing the particular not relevant resource to be loaded at runtime when a free connection is available, and (3) causing the particular not relevant resource to be loaded only after receiving a user request associated with the particular not relevant resource.

11. The system of claim 8, wherein re-ordering the first load sequence of the N resources into the revised second load sequence for the web application based on the determination of the relevant and not relevant resources comprises generating the revised second load sequence by moving resources determined to be not relevant to the CRP towards an end of the revised second load sequence and moving resources determined to be relevant to the CRP towards a beginning of the revised second load sequence.

12. A computer program product encoded on a non-transitory storage medium, the product comprising non-transitory, computer readable instructions for causing one or more processors to perform operations comprising:
identifying a visual completeness criteria associated with execution of a web application, wherein the visual completeness criteria comprises at least one of a completion of a document object model (DOM) for the web application or a predefined event occurring after loading of the web application, the web application including a plurality of N resources to be loaded upon initialization in a first load sequence, and wherein the visual completeness criteria defines an event occurring during the initialization, where N is a positive integer;
initializing the web application for execution, wherein the network roundtrips of each resource are monitored until the visual completeness criteria is satisfied and a first total elapsed time is determined;
iteratively performing N further initializations of the web application, wherein each of the N further initializations are performed while delaying loading of a different individual one of the N resources during a particular iteration, and wherein a particular resource is determined as not relevant to a critical rendering path (CRP) of the web application when the total time elapsed to the visual completeness criteria in the particular further initialization where the particular resource is delayed is below a threshold amount above the first total elapsed time, and wherein a particular resource is determined as relevant to the CRP when the total time elapsed to the visual completeness criteria where the particular resource is delayed above a threshold amount above the first total elapsed time; and
after completing the iterative performance of the N further initializations, automatically modifying the web application by re-ordering the first load sequence of the N resources into a revised second load sequence for the web application based on the determination of the relevant and not relevant resources.

13. The product of claim 12, further comprising, automatically modifying the web application by postponing the loading of the particular not relevant resources in the revised second load sequence until after the loading of each of the relevant resources, wherein the visual completeness criteria occurs after each of the relevant resources are loaded.

14. The product of claim 13, wherein postponing includes at least one of (1) moving the loading of the not relevant resource to a later stage within the revised second load sequence, (2) causing the particular not relevant resource to be loaded at runtime when a free connection is available, and (3) causing the particular not relevant resource to be loaded only after receiving a user request associated with the particular not relevant resource.

15. The product of claim 12, wherein re-ordering the first load sequence of the N resources into the revised second load sequence for the web application based on the determination of the relevant and not relevant resources comprises generating the revised second load sequence by moving resources determined to be not relevant to the CRP towards an end of the revised second load sequence and moving resources determined to be relevant to the CRP towards a beginning of the revised second load sequence.

* * * * *